No. 647,270. Patented Apr. 10, 1900.
A. C. LINDGREN.
DISK BEARING.
(Application filed Jan. 22, 1900.)

(No Model.)

on line a-a on line b-b

WITNESSES:

INVENTOR
A. C. Lindgren
BY
P. T. Dodge
ATTORNEY

UNITED STATES PATENT OFFICE.

ALEXUS C. LINDGREN, OF MOLINE, ILLINOIS, ASSIGNOR TO THE MOLINE PLOW COMPANY, OF ILLINOIS.

DISK-BEARING.

SPECIFICATION forming part of Letters Patent No. 647,270, dated April 10, 1900.

Application filed January 22, 1900. Serial No. 2,344. (No model.)

*To all whom it may concern:*

Be it known that I, ALEXUS C. LINDGREN, of Moline, county of Rock Island, and State of Illinois, have invented a new and useful Improvement in Disk-Bearings, of which the following is a specification.

This invention has reference to a bearing for the disk blades of harrows, cultivators, and like agricultural implements, the object of the invention being to minimize the friction of the parts; and the invention consists in an improved manner of applying between the disk and its bearing a series of friction-rollers with their longitudinal axes extending in the general direction of the axis of the disk, so that the rollers will receive on their sides the transverse pressure of the disk in its bearing.

The invention consists also in forming the bearing and rollers conical, and, further, in combining with these parts means independent of the rollers for taking up the end thrust of the disk, to the end that the rollers will be prevented from being crowded by the parts of the bearing.

The invention consists also in the details of construction and combination of parts hereinafter described and claimed.

Figure 1:
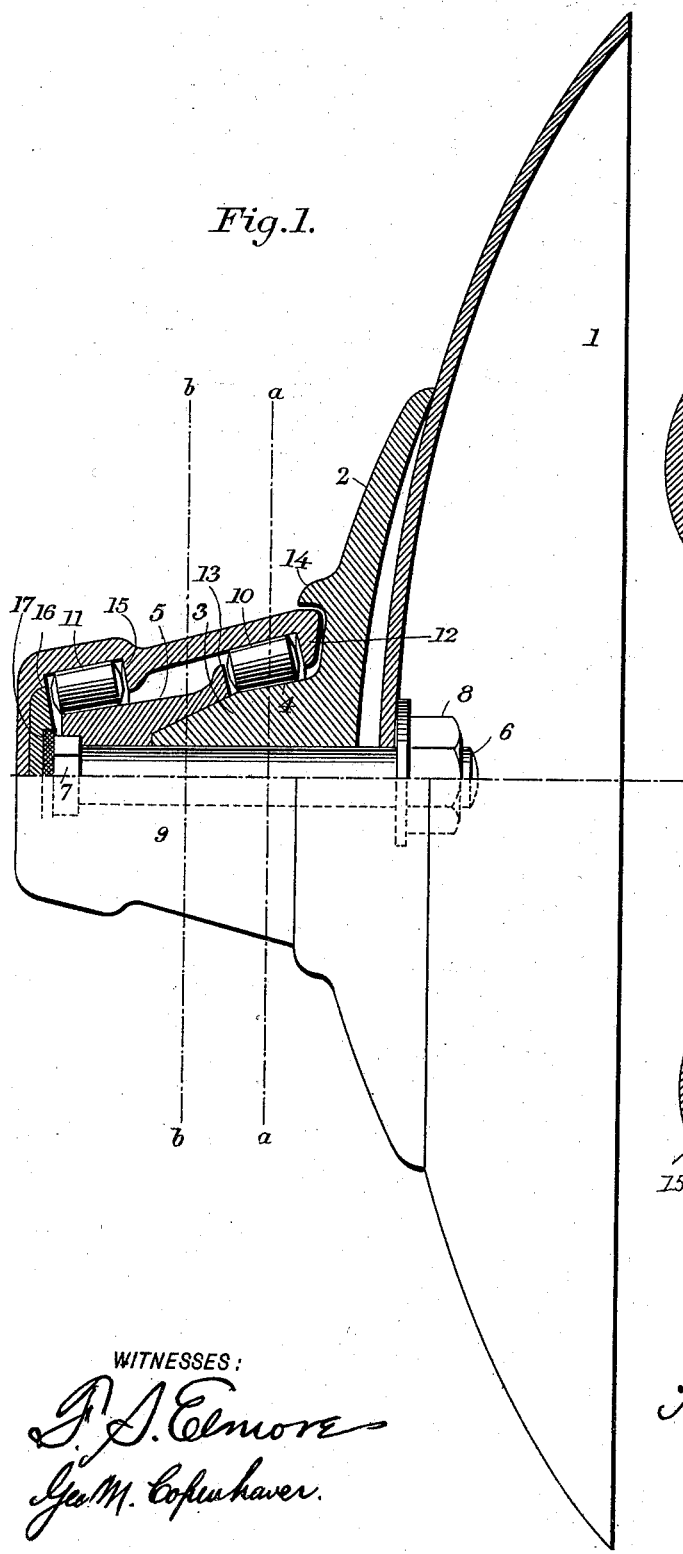
Figure 2:
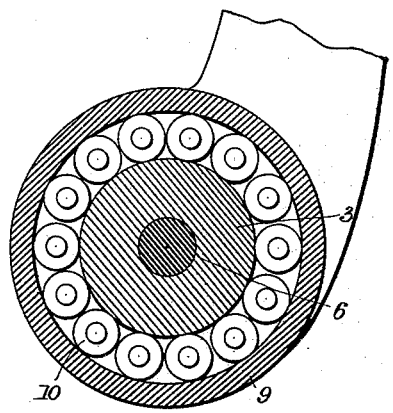
Figure 3:
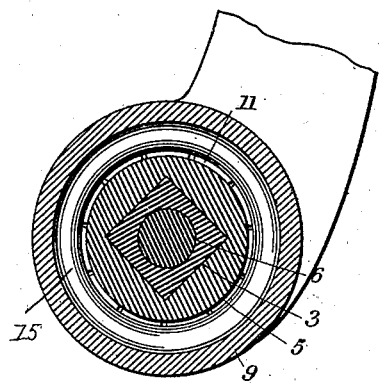

Referring to the drawings, Figure 1 is a view of my improved bearing, partly in elevation and partly in section. Fig. 2 is a vertical transverse section on the line $a$ $a$ of the preceding figure. Fig. 3 is a vertical transverse section on the line $b$ $b$ of Fig. 1.

In the accompanying drawings, 1 represents a cutting-disk of concavo-convex form, as usual, seated in the concave face of a supporting disk-like casting 2, having formed on its rear side a conical boss or hub 3. This hub adjacent to the body of the casting, as at 4, is circular in cross-section, as shown in Fig. 2, but beyond this its end is squared, as shown in Fig. 3, and on this squared end is seated a conical bearing-sleeve 5, forming a removable continuation of the hub. The disk, supporting-casting, and sleeve are firmly held in fixed relations by means of a central bolt 6, extending through these parts and provided with an angular head 7, seated in a corresponding socket in the end of the bearing-sleeve. The opposite end of the bolt is threaded and receives a nut 8, which bears on the concave face of the disk and serves to tighten the parts and hold them securely and rigidly together. By this construction the disk, its supporting-casting, and the bearing-sleeve are all caused to move together within a conical shell 9, which is adapted to be secured to the frame of the machine in any suitable manner. The internal diameter of this shell is somewhat greater than the diameter of the hub, so that an annular space is left between them, and in this space are seated two series of conical friction-rollers 10 and 11, one series, 10, between the cylindrical portion of the hub and the shell, near the forward end of the latter, and the other series, 11, between the bearing-sleeve and the shell, at the rear end of the latter. The rollers 10 are seated between an inwardly-extending flange 12 on the forward end of the shell and an annular shoulder 13, formed by the end of the bearing-sleeve 5, and these rollers thus serve, in connection with the flange and shoulder, to prevent the disk and its connected parts from escaping from the shell. The inwardly-extending flange 12 on the shell extends within a circular recess on the supporting-casting between the hub portion of the disk and an annular shoulder 14, projecting rearward from the supporting-casting. The shoulder 14, in connection with the flange 12, effectually prevents the entrance of dust or dirt to the wearing parts of the bearing.

The rollers 11 at the opposite end of the shell are seated between an inwardly-extending annular shoulder 15 on the shell and the outer edge of a washer-plate 16, seated centrally in the end of the shell. This washer-plate is formed with a central recess, in which is set a non-metallic washer 17, which may be of rawhide or other appropriate material, which serves as a bearing for the head of the bolt and acts to take up the end thrust of the disk, thereby preventing any crowding of the conical rollers between the conical bearing-surfaces.

From the foregoing description it will be seen that the bearing-surfaces and rollers are all conical, by reason of which the wear on the parts will be taken up by their tendency to wedge against each other, subject to the action of the washer in preventing any undue crowding. It is further seen that the axes of the rollers are in the general direction of the axis of the disk, so that the side strains of the revolving parts within the shell are borne by the sides of the rollers. It will be further seen that by the provision of the two series of rollers respectively at the front and rear of the shell the strains and pressure of the disk within the shell are distributed, part being received by the front rollers and part by the rear rollers, and as the greatest pressure in operating these disks is at the lower edge of the disk the pressure within the bearing is on the front rollers at the lower side of the bearing and the rear rollers at the upper side, so that the friction at these points is reduced to a minimum.

In assembling the parts the shell is placed on its end and the rollers 11 set in place within the same. The sleeve 5 is then slipped over the bolt 6 and set within the ring of rollers. The rollers 11 are next set in place within the shell with their ends resting on the end of the sleeve. The supporting-casting 3 is then passed over the bolt against the rollers and the disk applied, and finally the nut screwed on.

Having thus described my invention, what I claim is—

1. The combination with a fixed conical shell, of a disk having connected with it a conical hub extending within the shell, and conical rollers between the shell and hub.

2. The combination with a fixed conical shell, of a disk having a conical hub extending within the shell, and two series of conical rollers seated respectively at the front and rear of the shell between it and the hub.

3. The combination in a fixed conical shell, of a disk having a conical hub extending within the shell, conical friction-rollers situated between the hub and shell, and means independent of the rollers for taking up the end thrust of the disk; whereby the crowding of the rollers by the bearing-surfaces is prevented.

4. The combination with a shell having a washer in its end, of a cutting-disk, a hub thereon extending within the shell, a bearing-sleeve forming a continuation of the hub, a bolt connecting the disk, hub and sleeve together and provided with a head bearing against the washer, and friction-rollers situated between the shell and hub.

5. The combination with a shell formed at one end with an inwardly-extending annular flange, of a cutting-disk, a hub connected therewith and provided with an annular shoulder, and friction-rollers seated within the shell between the annular flange on the latter and the annular shoulder on the hub.

6. The combination with a cutting-disk, of a supporting-casting formed with an annular recess and with a hub, a shell surrounding the hub and provided with an inwardly-projecting flange extending in said recess, and friction-rollers situated between the hub and shell.

7. The combination with a shell, of a cutting-disk, a hub connected with the disk and extending in the shell, a bearing-sleeve on the end of the hub, a series of friction-rollers between the hub and the shell, and a second series of friction-rollers between the sleeve and shell.

8. The combination with a cutting-disk, of a hub thereon, a bearing-sleeve encircling the end of the hub, means for connecting the disk, hub and sleeve detachably together, a fixed shell surrounding the bearing-sleeve and hub and formed with an inwardly-extending flange, and a series of friction-rollers surrounding the hub between said inwardly-extending flange and the end of the bearing-sleeve.

9. The combination with a cutting-disk, of a hub connected therewith and formed with an annular shoulder, a fixed shell surrounding the hub and formed at its forward end with an inwardly-extending flange and near its rear end with an inwardly-extending annular shoulder, a series of friction-rollers surrounding the hub between the annular flange on the shell and the annular shoulder on the hub, and a second series of friction-rollers surrounding the hub between the inwardly-extending annular shoulder on the shell and the rear end of the shell.

10. In combination with a fixed shell, a washer-plate seated in its end, a non-metallic washer seated in said washer-plate, a cutting-disk, a hub fixed thereto, a bearing-sleeve applied to the hub and a bolt connecting said parts with its head bearing on the washer.

11. The combination with a cutting-disk, of a hub thereon, a bearing-sleeve detachably applied to the hub, a fixed shell provided with an inwardly-extending flange at its forward end, a series of friction-rollers surrounding the hub between the flange and the end of the sleeve and a second series of friction-rollers situated between the sleeve and the shell.

In testimony whereof I hereunto set my hand, this 15th day of January, 1900, in the presence of two attesting witnesses.

ALEXUS C. LINDGREN.

Witnesses:
A. J. BROSSEAU,
J. H. HOUGHTON.